(12) United States Patent
Sackl et al.

(10) Patent No.: US 7,951,036 B2
(45) Date of Patent: May 31, 2011

(54) DIFFERENTIAL TRANSMISSION UNIT FEATURING ACTIVE CONTROLLING OF THE MOMENT DISTRIBUTION

(75) Inventors: Walter Sackl, Wagersbach (AT); Manfred Rahm, Rein (AT); Jürgen Schranz, Graz (AT)

(73) Assignee: MAGNA Powertrain AG & Co KG, Lannach (AT)

( * ) Notice: Subject to any disclaimer, the term of this patent is extended or adjusted under 35 U.S.C. 154(b) by 797 days.

(21) Appl. No.: 11/919,148

(22) PCT Filed: Apr. 28, 2006

(86) PCT No.: PCT/EP2006/004018
§ 371 (c)(1),
(2), (4) Date: Jan. 22, 2008

(87) PCT Pub. No.: WO2006/114331
PCT Pub. Date: Nov. 2, 2006

(65) Prior Publication Data
US 2008/0287246 A1    Nov. 20, 2008

(30) Foreign Application Priority Data
Apr. 28, 2005 (AT) .............................. GM0277/2005

(51) Int. Cl.
*F16H 48/20* (2006.01)
(52) U.S. Cl. ........................................ 475/224; 475/244
(58) Field of Classification Search .................. 475/223, 475/224, 230, 231, 244
See application file for complete search history.

(56) References Cited

U.S. PATENT DOCUMENTS

| | | | |
|---|---|---|---|
| 4,973,296 A | 11/1990 | Shibahata | |
| 5,370,588 A | 12/1994 | Sawase et al. | |
| 5,910,064 A | 6/1999 | Kuroki et al. | |
| 6,056,660 A | 5/2000 | Mimura | |
| 6,120,407 A | 9/2000 | Mimura | |
| 6,949,047 B2* | 9/2005 | Okazaki | 475/231 |
| 7,338,404 B2* | 3/2008 | Gassmann et al. | 475/231 |
| 7,361,114 B2* | 4/2008 | Boddy | 475/231 |
| 7,549,941 B2* | 6/2009 | Boddy | 475/231 |

FOREIGN PATENT DOCUMENTS

| | | |
|---|---|---|
| DE | 39 00 638 C2 | 6/1994 |
| EP | 0548853 A1 | 6/1993 |
| EP | 0 662 402 A | 7/1995 |
| RU | 2192972 C2 | 11/2002 |
| WO | 2005/016683 A1 | 2/2005 |

* cited by examiner

*Primary Examiner* — Ha D. Ho
(74) *Attorney, Agent, or Firm* — Harness, Dickey & Pierce, P.L.C.

(57) ABSTRACT

Disclosed is a differential transmission unit featuring active controlling of the moment distribution. Said differential transmission unit comprises a differential transmission (4) with two output shafts (6, 7), the cage (5) of said differential transmission (4) forming the input member, and one respective controlled frictional clutch (22, 26) that is associated with an output shaft. The primary part (22) of the clutch is drivingly connected to the input member (5) while the secondary part (26) of the clutch is drivingly connected to the associated output shaft (6, 7), at least one of the driving connections being provided with an increased or reduced transmission ratio. In order to create a lightweight and small unit, the clutch (22, 26) surrounds the associated output shaft (6, 7), the central axis (13) thereof is offset relative to the central axis (12) of the associated output shaft (6, 7), and the secondary part (26) of the clutch, which surrounds the associated output shaft (6, 7), is provided with an internally toothed gear rim (30) which meshes with an externally toothed wheel (31) on the associated output shaft.

23 Claims, 5 Drawing Sheets

DIFFERENTIAL TRANSMISSION UNIT FEATURING ACTIVE CONTROLLING OF THE MOMENT DISTRIBUTION

CROSS-REFERENCE TO RELATED APPLICATIONS

This application is a 371 National Stage of International application No. PCT/EP2006/004018, filed Apr. 28, 2006. This application claims the benefit of GM 2005/0277, filed Apr. 28, 2005. The disclosure(s) of the above applications are incorporated herein by reference.

FIELD

The invention relates to a differential transmission unit having an active control of the torque distribution, comprising a differential transmission having two output shafts and a cage which forms the input member; and a controllable friction clutch associated with each of the output shafts, with the primary part of each clutch being connected drivewise to the input member and the secondary part of each clutch being connected drivewise to the associated output shaft, and wherein at least one of the drive connections has a step-up ratio or a step-down ratio.

BACKGROUND

The statements in this section merely provide background information related to the present invention and may not necessarily constitute prior art.

A conventional differential transmission compensates speed differences between the two output shafts, with the distribution of the torques resulting from the geometry, in particular from the number of teeth of the gears in the differential transmission. A differential transmission unit having an active variation of the torque distribution furthermore permits a direct influencing of the torque distribution. On use as an axle differential, for example, additional drive power can thus be supplied to the faster rotating outer corner wheel. An intervention is thus made in the driving dynamics of the vehicle. One therefore also speaks of "torque vectoring".

Such differential transmission units can be arranged both as an axial differential (between the wheels of an axle) and as an interaxial differential (between two driven axles). An embodiment as an axial differential is known from DE 39 00 638 C2. The clutches there are arranged on a lay shaft which is driven by the input member via a first drive connection. A respective second drive connection leads to the axis shafts from each of the two clutches. Gears which effect a low step-up ratio overall serve for the drive connection, whereby an additional torque is supplied with a more or less closed clutch of the respective axial shaft. The low step-up ratio makes gears of approximately equal size necessary, of which those of the first drive connection have to be designed for a very high torque. This differential transmission unit becomes heavy and bulky due to this and due to the lay shaft arranged in parallel at some distance. It thus substantially increases the weight of a motor vehicle and cannot be accommodated in the tightly dimensioned space in the axial region.

SUMMARY

It is thus the object of the invention to design a differential transmission unit such that it has a light construction and takes up a small space.

The clutches surrounding the associated output shaft admittedly have a larger external diameter; however, since they are arranged approximately in alignment with the large crown wheel, the housing thereby hardly becomes larger. In addition, the friction surface of a clutch disk increases with the second power of the radius so that the sufficiency is found with fewer disks. The slight offset of its central axis with respect to the central axis of the associated output shaft does not affect this. It rather allows the use of gears with internal teeth which can be designed substantially smaller due to the high degree of coverage thus achievable (a lot of teeth are simultaneously in engagement) and are in addition better suited for the gear ratios deviating only a little from the ratio one to one. They need much less construction space overall since a gear is inside the other. The internal diameter of the secondary part of the clutch surrounding the associated output shaft can thereby also be kept small.

The differential transmission unit includes a first drive connection between the input member and the clutch and a second drive connection between the clutch and the axial shaft. There are different possibilities within the framework of the invention for the first drive connection. They all have in common that they must also permit the same axial offset.

In a first embodiment, this first drive connection is established by means of a hollow gear connected to the primary part of the clutch and by means of a gear with outer teeth connected to the input member and meshing with the hollow gear. In a second embodiment, this first drive connection is established by means of a gear with outer teeth connected to the primary part of the clutch and by means of a hollow gear which is connected to the input member and which meshes with the gear with outer teeth. The advantages of inner teeth are exploited in full in both embodiments. Which of the two is to be preferred depends on the desired gear ratio and on the construction circumstances.

In a particularly advantageous design, the secondary part of the clutch is supported in the housing of the differential transmission unit and the primary part is centered on the secondary part. This is space saving and provides favorable support relationships and short tolerance chains.

In a third embodiment, the first drive connection, that is the connection between the input member and the primary part of the clutch, is established by a synchronous axial offset clutch. Such an embodiment admittedly does not permit a step-up ratio differing from one to one, but this can be established in the second drive connection which in any case has inner teeth. The synchronous axial offset clutch advantageously comprises two axially offset disks and at least three connection plates coupling them on three radii, with the first disk being rotationally fixedly connected to the input member and the second disk being rotationally fixedly connected to the primary part. This has the advantage that the reaction forces cancel one another that so that the bearings of the rotating parts are thereby put under less strain.

In another embodiment, the synchronous axial offset clutch comprises two axially offset disks which cooperate in the manner of an Oldham clutch via an intermediate disk.

The named secondary part of the clutch is preferably the inner part of the clutch. Alternatively to this, it is also possible for all of the named embodiments that the secondary part of the clutch is its outer part, in particular when a speed reducing ratio should take place.

DRAWINGS

The invention will be described and explained in the following with reference to Figures. There are shown:

FIG. 1 illustrates a differential transmission unit in accordance with the invention in a first embodiment, in schematic form;

FIG. 2 includes cross-sections in accordance with IIa and IIb in FIG. 1;

DETAILED DESCRIPTION

Figure 1:
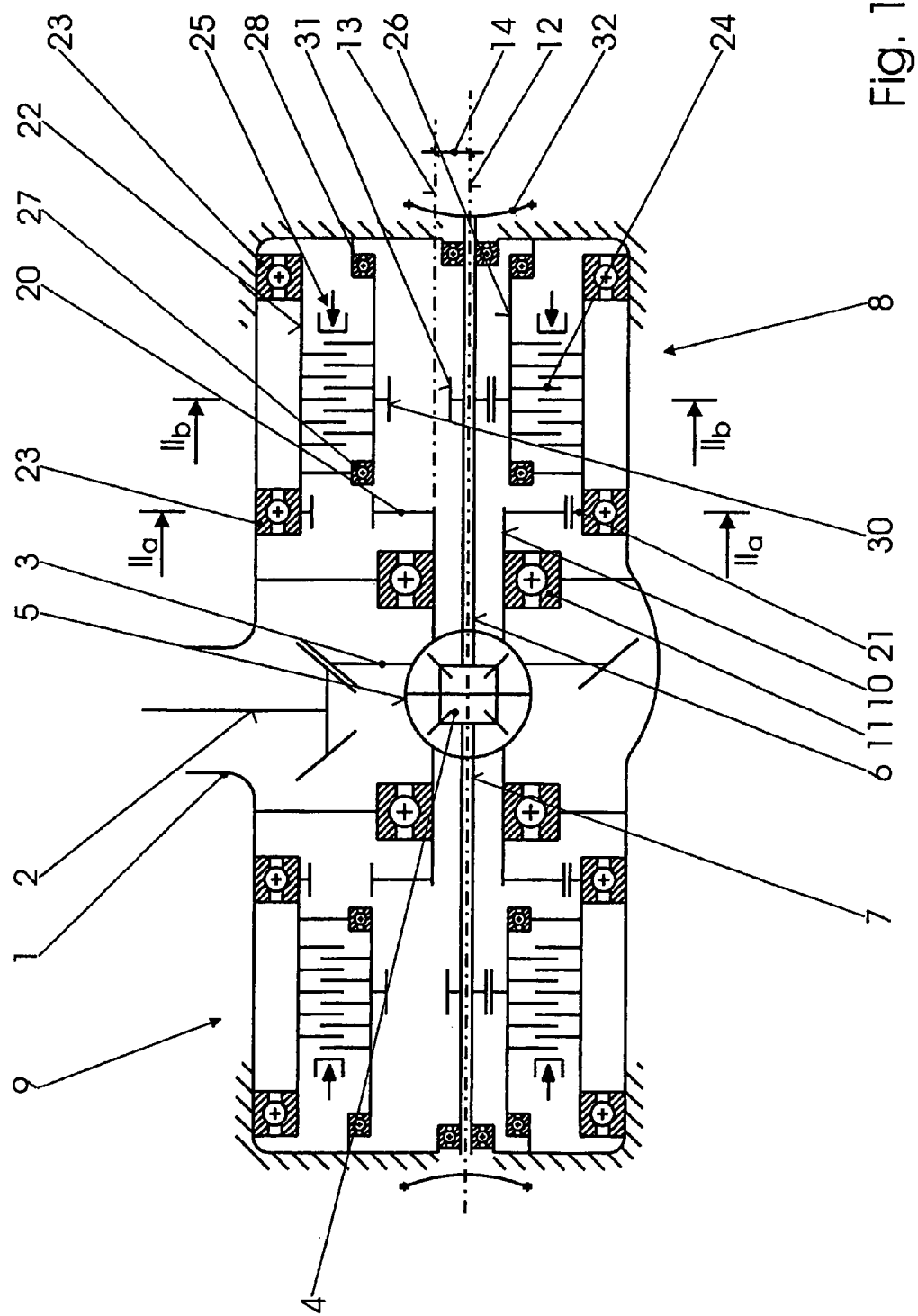

In FIG. 1, the housing of a differential transmission unit is indicated and is marked by 1. Here, it is an axial differential of a motor vehicle having a powertrain extending in the longitudinal direction and ending in the housing 1 with a pinion 2 which meshes with a crown wheel 3. A spur gear stage would be possible instead of the pinion 2 and the crown wheel 3 in a vehicle having a transversely installed engine or when the differential transmission unit is an interaxial differential.

The crown wheel 3 surrounds a differential transmission 4 and is rotationally fixedly connected to its differential cage 5. This forms the input member of the differential transmission unit. A right hand axial shaft 6 and a left hand axial shaft 7 are provided here on the two opposite sides of the housing 1. The total differential transmission unit is thus structured into a differential 4 and into two torque superimposition units 8, 9, one on each side. The torque superimposition units 8, 9 are generally the same so that only one side will be described in the following.

The differential cage 5 merges into a hollow shaft 10 which is supported in the housing 1 by means of a bearing 11 and is concentric with the axial shaft 6 or its centerline 12. It supports a first gear 20 which meshes with a first hollow gear 21. The first hollow gear 21 is here fixedly connected to the primary part 22 of a clutch and rotates with it around an axis 13 which is offset by an amount 14 with respect to the centerline 12. The primary part 22 of the clutch is here its outer part and is supported by means of bearings 23 in the housing 1. The secondary part 26 of the clutch is the inner part and a disk package 24 comprising mutually alternating outer disks and inner disks with a circular ring contour is located between the secondary part 26 and the primary part 22 of the clutch. The secondary part 26 of the clutch is rotatably supported in the outer clutch part 22 by means of a bearing 27 and is rotatably supported in the housing 1 by means of a bearing 28. A pressure plate 25 is provided to act on the clutch.

A second hollow gear 30 is fastened at the interior of the secondary part 26 of the clutch. It meshes with a second gear 31 which is rotationally fixedly connected to the right hand axial shaft 6 and whose axis is thus again in the centerline 12. The axial shaft 6 projects out of the housing 1 and there forms a flange 32 (see FIG. 6) which establishes the drive connection to a wheel.

Figure 2:
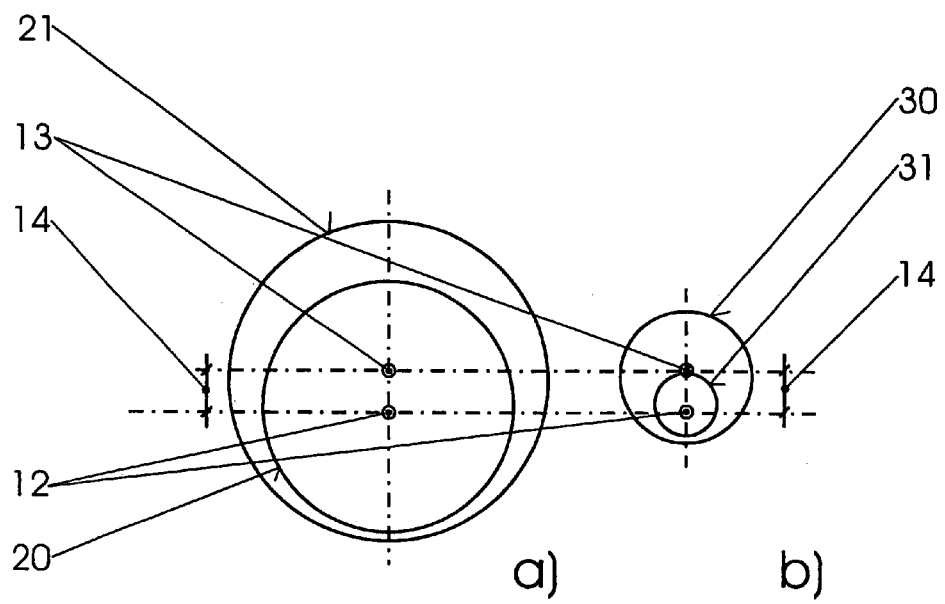

The engagement conditions of the two drive connections are shown schematically in cross-section in FIG. 2. The first gear 20 rotating around the axis 12 meshes with the hollow gear 21 rotating around the axis 13 and the second hollow gear 30 rotating around the axis 13 meshes with the second gear 31 in turn rotating around the axis 12. Gear ratios close to a ratio 1:1 can easily be reached in this manner with the external dimensions of only one single gear. Gears with outer teeth would be of approximately equal size for such gear ratios and would take up twice as much construction space in a plane transverse to their axis.

Figure 3:
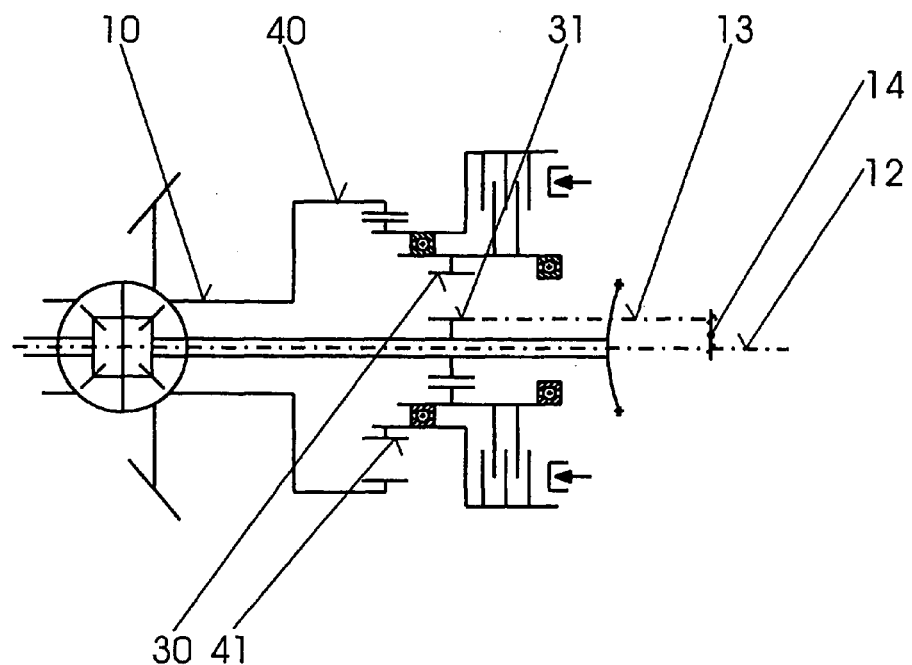
FIG. 3 illustrates a differential transmission unit in accordance with the invention in a second embodiment, in schematic form.

The embodiment of FIG. 3 differs from that of FIG. 1 only in the design of the first drive connection. Here, the hollow shaft 10 rotationally fixedly connected to the differential cage 5 supports, instead of a gear with outer teeth, a first hollow gear 40 which meshes with a first gear 41. The first hollow gear 40 accordingly rotates around the first axis 12 and the first gear 41 rotates around the second axis 13 offset thereto by an amount 14. The second drive connection between the second hollow gear 30 and the second gear 31 is unchanged.

Figure 5:
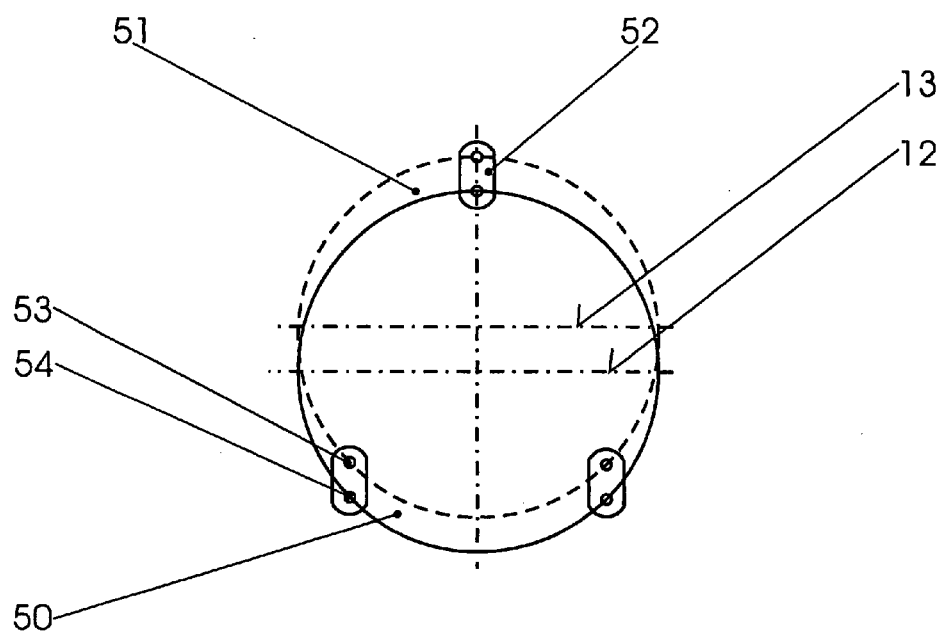
FIG. 5 is a cross-section taken along line V-V in FIG. 4.
Figure 4:
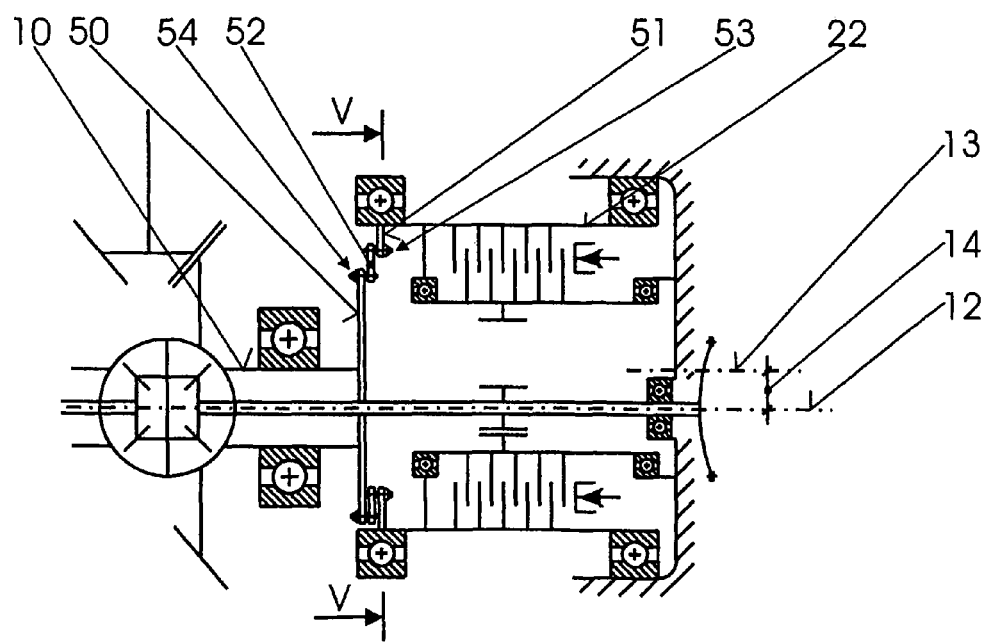
FIG. 4 illustrates a differential transmission unit in accordance with the invention in a third embodiment.

The variant of FIG. 4 differs from that of FIG. 1 again only in the first drive connection between the hollow shaft 10 and the primary part 22 of the clutch. A first disk 50 is fastened to the hollow shaft 10 and a second disk 51 is fastened to the primary part 22 of the clutch. The two disks thus again have axes of rotation mutually offset by the amount 14. Three plates 52 are provided for the synchronous transmission of the rotary movement whose one end is pivotable around a pivot spigot 53 in the second disk and whose other end is pivotable around a pivot spigot 54 in the first disk 50. The kinematic relationships can be recognized better in FIG. 5.

Figure 6:
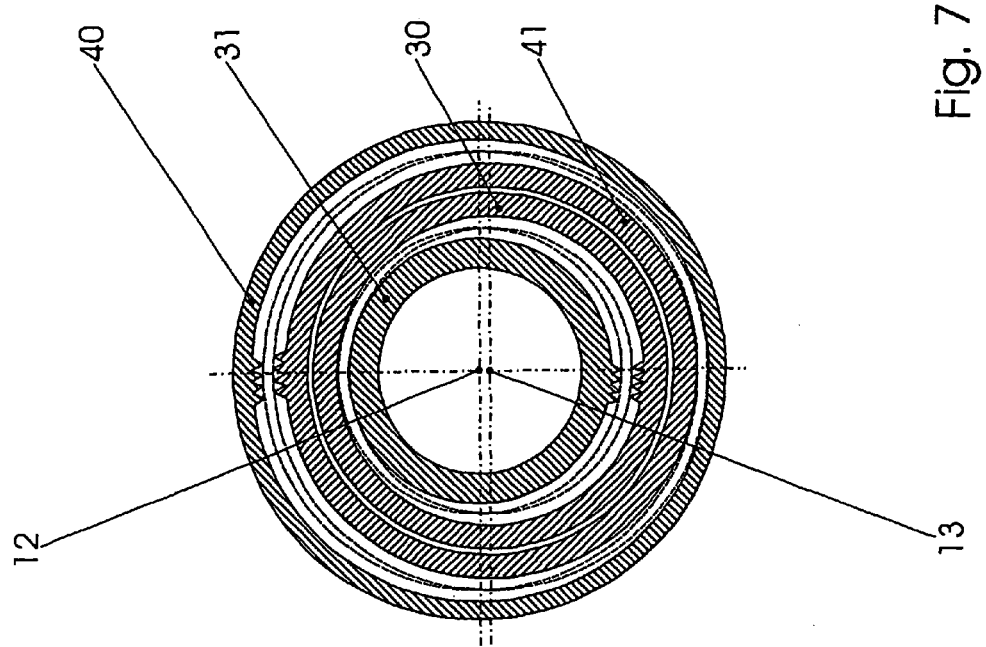
FIG. 6 illustrates a practical design of the second embodiment in longitudinal section.
Figure 7:
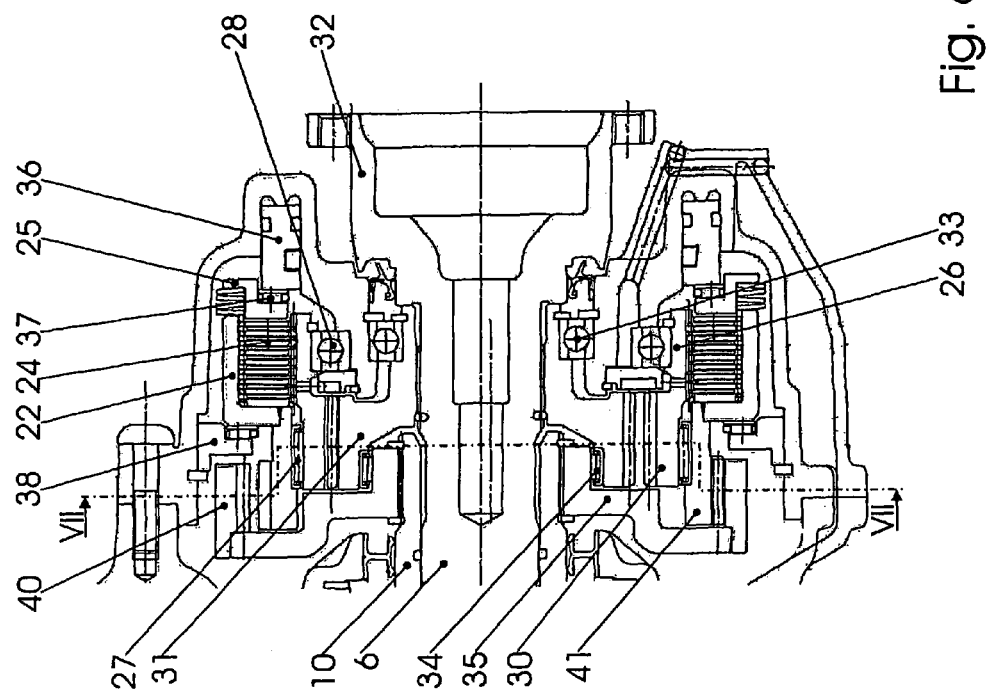
FIG. 7 is a cross-section taken along line VII-VII in FIG. 6.

FIG. 6 and FIG. 7 show a preferred embodiment of the variant of FIG. 3. It largely corresponds to the description of FIG. 1 and FIG. 2 so that their reference numerals are also used. It only differs in the embodiment of the supports of the rotating parts. The wheel shaft 6 is thus supported by means of a bearing 33 in the housing 1 and is thus centered with respect thereto. A needle bearing 34 designed for the centering of the hollow shaft and of the first hollow gear 40 fixedly connected thereto with respect to the second gear 31 is between the second gear 31 rotationally fixedly connected to the wheel shaft 6 and a disk 35 of the first hollow gear 40. The second hollow gear 30 with the axis of rotation 13 is supported in the housing 1 by means of bearings 28 and in turn centers the primary part 22 of the clutch by means of a needle bearing 27. A hydraulically loaded ring piston 36 acts on said primary part via a needle bearing 37 on the pressure plate 25, on the one hand, with an abutment 38 absorbing the force exerted by the ring piston 36.

Figure 8:
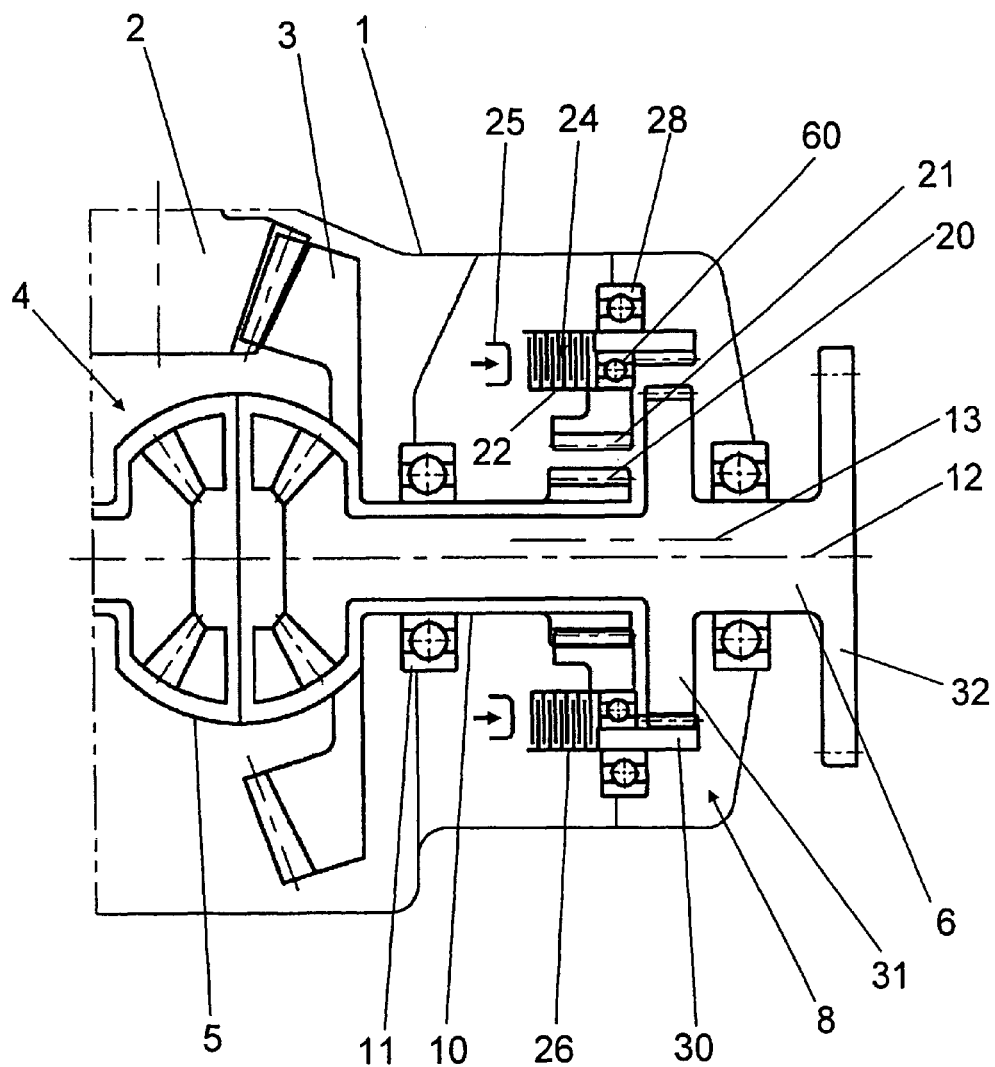
FIG. 8 illustrates a variant of the first embodiment in accordance with FIG. 1.

FIG. 8 shows a variant of the differential transmission unit in accordance with FIG. 1 (only right hand side with axial shaft 6 and torque superimposition unit 8). A first hollow gear 21 meshing with a first gear 20 of a hollow shaft 10 is also fixedly connected to the primary part 22 of a clutch here. The first hollow gear 21 rotates with the clutch around an axis 13 which is offset with respect to the centerline 12. A second hollow gear 30 is fastened to the secondary part 26 of the clutch. It meshes with a second gear 31 which is rotationally fixedly connected to the axial shaft 6 and whose axis is thus again in the centerline 12. The first hollow gear 21 (with the primary part 22 of the clutch) is rotatably supported on the second hollow gear 30 (with the secondary part 26 of the clutch) by means of a bearing 60, said secondary part in turn being rotatably supported in the housing 1 by means of a bearing 28.

In contrast to the embodiments described above, in the variant in accordance with FIG. 8, the primary part 22 of the clutch is its inner part and the secondary part 26 of the clutch is its outer part.

It must finally be noted with respect to all the embodiments named in connection with the invention that, instead of a spherical differential transmission, a spur gear differential transmission can also be used, with an arrangement of the two clutches and torque superimposition units asymmetrically on one side of the differential transmission, with the cage (housing) of the differential transmission forming the input member.

The invention claimed is:

1. A differential transmission unit having an active control of a torque distribution, comprising: a differential transmission having two output shafts and a cage forming an input member; a pair of controllable friction clutches each associated with one of the output shafts, with a primary part of each clutch being connected drivewise to the input member and a secondary part of each clutch being connected drivewise to the associated output shaft and at least one of the drive connections having a step-up ratio or a step-down ratio, wherein the clutch surrounds the associated output shaft and its central axis is offset with respect to a central axis of the associated output shaft, and wherein the secondary part of the clutch surrounding the associated output shaft has an annular gear with inner teeth which meshes with a gear having outer teeth on the associated output shaft.

2. The differential transmission unit in accordance with claim 1, wherein the drive connection between the input member and the primary part of the clutch is established by means of a first hollow gear connected to the primary part and by means of a first gear having outer teeth connected to the input member and meshing with the first hollow gear.

3. The differential transmission unit in accordance with claim 1, wherein the drive connection between the input member and the primary part of the clutch is established by means of a first gear with outer teeth connected to the primary part and by means of a first hollow gear which is connected to the input member and which meshes with the first gear.

4. The differential transmission unit in accordance with claim 3, wherein the secondary part of the clutch is supported in a housing of the differential transmission unit and the primary part is centered on the secondary part.

5. The differential transmission unit in accordance with claim 1, wherein the drive connection between the input member and the primary part of the clutch is established by a synchronous axial offset clutch.

6. The differential transmission unit in accordance with claim 5, wherein the synchronous axial offset clutch comprises first and second axially offset disks and at least three plates coupling the first and second disks, with the first disk being rotationally fixed to the input member and the second disk being rotationally fixedly connected to the primary part of the clutch.

7. The differential transmission unit in accordance with claim 5, wherein the synchronous axial offset clutch comprises two axially offset disks which cooperate in the manner of an Oldham clutch.

8. The differential transmission unit in accordance with claim 1, wherein the secondary part of the clutch is its inner part.

9. The differential transmission unit in accordance claim 1, wherein the secondary part of the clutch is its outer part.

10. A differential transmission unit, comprising:
a housing;
a differential rotatably supported in said housing and including an input member and first and second output members aligned for rotation about a first axis;
a first output shaft rotatably supported by said housing an rotationally fixedly connected to said first output member for rotation about said first axis;
a second output shaft rotatably supported by said housing and rotationally fixedly connected to said second output member for rotation about said first axis; and
a torque superimposition unit including a friction clutch surrounding said first output shaft and supported for rotation about a second axis that is offset from said first axis, a first drive connection between said input member and a first clutch part of said friction clutch and a second drive connection between a second clutch part of said friction clutch and said first output shaft, wherein at least one of said first and second drive connections establishes a non-direct speed ratio between said input member and said first output shaft in response to actuation of said friction clutch, and wherein said second drive connection includes a first gear fixed to said second clutch part having inner gear teeth that are meshed with outer gear teeth of a second gear fixed to said first output shaft.

11. The differential transmission unit of claim 10 wherein said first drive connection includes a first rotary member driven by said input member and a second rotary member driven by said first clutch part of said friction clutch.

12. The differential transmission unit of claim 11 wherein said first rotary member is a third gear and said second rotary member is a fourth gear that is meshed with said third gear.

13. The differential transmission unit of claim 12 wherein said third gear has external gear teeth that are meshed with internal gear teeth of said fourth gear.

14. The differential transmission unit of claim 12 wherein said third gear has internal gear teeth that are meshed with external gear teeth of said fourth gear.

15. The differential transmission unit of claim 11 wherein said first rotary member is a first disk and said second rotary member is a second disk that is axially offset relative to said first disk, and wherein said first drive connection further includes intermediate plates pivotably interconnecting the axially offset first and second disks to define a synchronous offset clutch.

16. The differential transmission unit of claim 10 wherein said first and second clutch parts are coaxially aligned for rotation about said second axis, and wherein said second clutch part is disposed between said first clutch part and said first output shaft.

17. The differential transmission unit of claim 16 wherein said second clutch part is rotatably supported by said housing and said first clutch part is centered on said second clutch part.

18. The differential transmission unit of claim 10 further comprising a second superimposition unit including a second friction clutch surrounding said second output shaft and supported for rotation about said second axis, a third drive connection between said input member and a first clutch part of said second friction clutch and a fourth drive connection between a second clutch part of said second friction clutch and said second output shaft, wherein at least one of said third and fourth drive connections establishes a non-direct speed ratio between said input member and said second output shaft in response to actuation of said second friction clutch.

19. A differential transmission unit comprising:
a housing;
a differential rotatably supported in said housing and including an input member and first and second output members aligned for rotation about a first axis; and
a torque superimposition unit operably disposed between said input member and said first output member and including a friction clutch supported in said housing for rotation about a second axis that is offset from said first axis, a first drive connection between said input member and a first part of said friction clutch and a second drive connection between a second part of said friction clutch and said first output member, wherein said first drive connection includes a first gear fixed to said input member for rotation about said first axis and which is meshed with a second gear fixed to said first part of said friction clutch for rotation about said second axis.

20. The differential transmission unit of claim 19 wherein said second drive connection includes a third gear fixed to said second part of said friction clutch for rotation about said second axis and which is meshed with a fourth gear fixed to said first output member for rotation about said first axis.

21. The differential transmission unit of claim 20 wherein said third gear has internal teeth meshed with external teeth on said fourth gear.

22. The differential transmission unit of claim 19 wherein said first gear has external teeth that are meshed with internal teeth of said second gear.

23. The differential transmission unit of claim 19 wherein said first gear has internal teeth that are meshed with external teeth and said second gear.

* * * * *